United States Patent [19]

Hata et al.

[11] Patent Number: 5,206,325
[45] Date of Patent: Apr. 27, 1993

[54] THERMOPLASTIC GRAFT COPOLYMER AND PROCESS FOR PRODUCING THE SAME

[75] Inventors: Tadashige Hata; Kazuhiko Matsuzaki; Shiyuzi Yahiro, all of Kurashiki, Japan

[73] Assignee: Asahi Kasei Kogyo Kabushiki Kaisha, Osaka, Japan

[21] Appl. No.: 773,922

[22] PCT Filed: Feb. 26, 1991

[86] PCT No.: PCT/JP91/00254

§ 371 Date: Oct. 25, 1991

§ 102(e) Date: Oct. 25, 1991

[87] PCT Pub. No.: WO91/13108

PCT Pub. Date: Sep. 5, 1991

[30] Foreign Application Priority Data

Feb. 27, 1990 [JP] Japan ................................. 2-46416

[51] Int. Cl.$^5$ .................... C08G 2/18; C08B 11/00; C08B 37/00; C08B 37/16
[52] U.S. Cl. .................................... 527/305; 527/309
[58] Field of Search .................................. 527/305, 309

[56] References Cited

U.S. PATENT DOCUMENTS 3,218,295 11/1965 Cline .
3,539,477 11/1970 Hermann ............................ 527/305
3,839,173 10/1974 Blaszczak ............................ 527/309

FOREIGN PATENT DOCUMENTS 2192130 2/1974 France .
50-98596 8/1975 Japan .
1-242601 9/1989 Japan .

OTHER PUBLICATIONS

Miyagi et al. in Journal of Wood Chemistry and Technology, 3(1), 59–78, Mar. 1983, article entitled "Preparation and Thermal Properties of Acetates Derived from Cellulose Dissolved in DMSO-PF".
European Search Report, Apr. 21, 1992, Application No. EP 91 90 4347.
International Search Report completed on May 20, 1991 in the Japanese Patent Office by Kunihiko SATO citing the aforementioned Japanese prior art references.

*Primary Examiner*—John Kight, III
*Assistant Examiner*—Jeffrey Culpeper Mullis
*Attorney, Agent, or Firm*—Pennie & Edmonds

[57] ABSTRACT

A thermoplastic resin is formed by imparting thermoplasticity to monosaccharide and/or polysaccharide units to form engineering resin that has excellent mechanical property attributes and excellent biodegradability. A thermoplastic graft copolymer is formed by graft-polymerizing graft to backbone. The copolymer comprises backbone which constitutes the monosaccharide and/or polysaccharide units each having a functional group selected from the group consisting of the hydroxyl group, carboxyl group, amino group and amido group, and graft constituting the polyacetal units consisting of repetitive oxymethylene units $-(CH_2O)-$ that are reaction-bonded with each other through the functional group, the polyacetal units being graft-polymerized to the monosaccharide and/or polysaccharide units. The copolymer has viscosity of 0.1–10 (dl/g) and a melting point of 150°–175° C. The thermoplastic graft copolymer of the present invention exhibits excellent mechanical property attributes required for engineering resin and excellent biodegradability. The graft copolymer can be put to a wide range of uses including film, sheets, electric and electronic parts, automotive parts and so forth. Moreover, molded articles from the graft copolymer, after being discarded can easily be biodegraded. Thus, the copolymer is of great industrial value.

12 Claims, No Drawings

THERMOPLASTIC GRAFT COPOLYMER AND PROCESS FOR PRODUCING THE SAME

TECHNICAL FIELD

The present invention relates to a thermoplastic graft copolymer. More particularly, the present invention relates to a thermoplastic graft copolymer comprising monosaccharide units and/or polysaccharide units as the backbone and polyacetal units as the graft, which has both excellent biodegradability and engineering resin properties, wherein the polyacetal units impart thermoplasticity to monosaccharide or polysaccharide.

BACKGROUND ART

Polyacetal resins generally have excellent mechanical properties, such as creep characteristic, fatigue characteristic, and electric properties suitable for producing engineering resins. Polyacetal resins, because of their inherent strong mechanical properties, are widely used, for example for producing automotive, electrical, and electronic parts.

Polyacetal resins are usually obtained by homopolymerizing or copolymerizing formaldehyde or trioxane with a cyclic ether, with a compound having an active hydrogen, such as water, alcohol and the like, used as a chain transfer agent. However, polyacetal resins obtained in this manner are not biodegradable.

On the other hand, while monosaccharides and polysaccharides are biodegradable, they alone cannot be used as a thermoplastic resin. At present, polysaccharides, used as a monomer, can produce thermoplastic resins, but only in a very limited capacity. For example, cellulose can be used in injection molding, extrusion, etc., after being subjected to esterification, etherification, and the like. The problem with this type of thermoplastic resins, however, is that they do not provide the necessary engineering resin mechanical properties, fatigue characteristic etc., and therefore, are not suitable for forming engineering resins.

DISCLOSURE OF THE INVENTION

The object of the present invention is to form a novel copolymer by imparting thermoplasticity to monosaccharides or polysaccharides, or to combination of both, to produce a biodegradable thermoplastic engineering resin which has excellent mechanical properties characteristic of polyacetal resins.

The present object is attained by homopolymerizing formaldehyde in the presence of monosaccharide or polysaccharide, or combination of both, to obtain a thermoplastic graft copolymer comprising monosaccharide units or polysaccharide units as the backbone and polyacetal units consisting of repetitive oxymethylene units $-(-CH_2O-)-$ as the graft.

Japanese Patent Application Kokoku (Post-Exam. Publn.) No. 46-22054 (1971) discloses a method of forming a polymer by subjecting trioxane and cyclic ether to a cationic polymerization in the presence of saponified cellulose ester. However, the polymer obtained in this manner not only lacks the biodegradability of the present copolymer, it also deteriorates the useful mechanical properties that are characteristic of polyacetal resin. The polymer therefore does not provide the necessary engineering resin properties.

J. Wood Chem. Technol., 3 (1), 59 (1983) discloses a polymer formed by reacting cellulose and paraformaldehyde in dimethyl sulfoxide (DMSO). Although this method effectively imparts thermoplasticity to the cellulose, it does not result in a polymer having the necessary engineering resin properties, such as those mechanical properties characteristic of the present copolymer.

BEST MODE FOR CARRYING OUT THE INVENTION

The present inventors have made extensive studies to solve the aforementioned problems. In their studies, the inventors have discovered a novel graft copolymer comprising monosaccharide units or polysaccharide units as the backbone and polyacetal units as the graft. The present graft copolymer is not only biodegradable, it has the necessary engineering resin properties.

According to the present invention, a thermoplastic graft copolymer comprises monosaccharide or polysaccharide, each having a functional group selected from the group consisting of the hydroxyl group, carboxyl group, amino group, and amido group, and polyacetal unit which is a polymer consisting of repetitive oxymethylene units $-(-CH_2O-)-$ that are reaction-bonded through the functional group. The polyacetal units, which constitute the graft, are graft-bonded to the monosaccharide units or polysaccharide units, which constitute the backbone. The copolymer produces a viscosity of 0.1-10 (dl/g) and a melting point of 150°-175° C., excellent for using as an engineering resin.

The thermoplastic graft copolymer is formed by homopolymerizing formaldehyde in the presence of monosaccharide and/or polysaccharide, each having a functional group selected from the group consisting of the hydroxyl group, carboxyl group, amino group and amido group, and in the presence of an anionic polymerization catalyst.

The present thermoplastic graft copolymer is a novel thermoplastic graft copolymer which comprises monosaccharide or polysaccharide, each having a functional group selected from the group consisting of the hydroxyl group, carboxyl group, amino group, and amido group, and polyacetal reaction-bonded with each other through the functional group. The polyacetal units which constitute the graft, are graft-bonded to monosaccharide units or polysaccharide units, which constitute the backbone.

The "polyacetal unit" referred to herein is a polymer consisting of the repetition of oxymethylene units $-(-CH_2O-)-$.

The graft copolymer of the present invention immediately after polymerization has been found to be unstable because the polyacetal unit contains a hydroxyl group at one side terminal thereof. The unstable terminal is thereafter converted into a stable group by a known method such as esterification, etherification, urethanization, etc., the resulting polymer can then be used.

The monosaccharide unit or polysaccharide unit, which is the one side segment constituting the graft copolymer of the present invention, is derived from monosaccharide or polysaccharide having at least one functional group selected from the group consisting of the hydroxyl group, carboxyl group, amino group, and amido group. Typical examples of monosaccharide and polysaccharide are as follows:

In the first group, examples made of monosaccharides include glucose, allose, altrose, mannose, gulose, idose, galactose, talose, fructose, ribose, arabinose, xylose, lyxose, erythrulose, threose, glucosamine, galactosamine, and the like.

In the second group, examples made of polysaccharides include maltose, isomaltose, cellobiose, lactose, sucrose, amylose, amylopectin, cellulose, pectic acid, chitin, chitosan, hyaluronic acid, dextran, pulluran, curdlan, sclerotane, β-1,3-glucan, levan α-1,6-mannan, cyclodextrin, xanthan gum, succinoglycan, and the like.

In the third group, examples made of compounds produced by chemically modifying a part or the whole of the functional groups of the monosaccharide or polysaccharide mentioned above include esterification, etherification, methylolation, tosylation, etc. Preferable methods of chemical modification are esterification, etherification and methylolation because of the ease of the production process.

Examples of esterification may be formed of acetylation, nitration, propionylation, butyrylation, methylcarbamylation, phenylthiocarbamylation, methoxycarbonylation, methacryloylation, etc.

Examples of etherification may be formed of methylation, ethylation, benzylation, carboxymethylation, carboxyethylation, hydroxyethylation, hydroxpropylation, etc.

It is preferable to select among the chemically modified compounds, those formed by methylolation, esterification or etherification of a part of the hydroxyl groups of cellulose because of their wide availability. Typical examples of such compounds include methylol cellulose, acetyl cellulose, nitrocellulose, propionyl cellulose, butyl cellulose, methyl cellulose, ethyl cellulose, hydroxymethyl cellulose, hydroxyethyl cellulose, hydroxypropyl cellulose, carboxymethyl cellulose carboxymethyl cellulose, carboxymethyl hydroxyethyl cellulose, benzyl cellulose, and the like.

As previously stated, the graft copolymer of the present invention has a melting point of 150°–175° C. The melting point of the graft copolymer of the present invention is an index for expressing the degree of polymerization of the polyacetal unit—the higher the melting point, the higher the degree of the polymerization of the polyacetal unit.

The content of monosaccharide units or polysaccharide units in the graft copolymer of the present invention is 1–60% by weight based on the total weight of the graft copolymer. When the content of monosaccharide units or polysaccharide units is less than 1% by weight, the biodegradability of the copolymer becomes poor. When the content of monosaccharide units exceeds 60% by weight, the mechanical properties, fatigue characteristic etc. become greatly deteriorated. The preferable content range therefore is 10–50% by weight.

The proportion of monosaccharide units and/or polysaccharide units in the graft copolymer of the present invention, or the structure of the graft copolymer, i.e., the presence or absence of reaction bonding between polyacetal and monosaccharide and/or polysaccharide can be confirmed by the following methods:

When the graft copolymer is hydrolyzed in an acidic aqueous solution, the part of polyacetal units is converted into formaldehyde. The formaldehyde is analyzed quantitatively by means of gas chromatography.

The monosaccharide units or polysaccharide units contained in the graft copolymer are converted into monosaccharide or polysaccharide having a hydroxyl group, carboxyl group, or amino group, because the linkages between the monosaccharide units or polysaccharide units and the polyacetal units are cleaved by an acid or the like.

The monosaccharide and/or polysaccharide is analyzed quantitatively by means of the liquid chromatography, IR, NMR, GPC or other suitable technique.

The graft copolymer of the present invention must have viscosity in the range of 0.1–10 (dl/g).

The viscosity referred to herein is determined in a mixed solvent system consisting of 50% by weight of p-chlorophenol and 50% by weight of tetrachloroethane by using a conventional Ostwald's viscometer at 60° C. More specifically, 25 mg of the graft copolymer is dissolved in 5 ml of the above-mentioned solvent mixture, and the time ($T_1$) required for the solution to pass between the marks of the viscometer at 60° C. is determined. A similar determination is made with the above-mentioned solvent mixture alone and the required time is put as $T_2$. The viscosity provides an index of the molecular weight of the graft copolymer, the viscosity being calculated by the following formula:

$$\text{Viscosity} = \frac{T_1 - T_2}{T_2} \times 2 \text{ (dl/g)}$$

When the viscosity of the graft copolymer is less than 0.1 (dl/g), the graft copolymer looses its engineering resin properties and becomes unsuitable for use. When the viscosity is larger than 10 (dl/g), the graft copolymer looses the processability and also becomes unsuitable for use.

The preferable viscosity of the graft copolymer should be in the range of 0.5–5 (dl/g).

Next, the process for producing the thermoplastic graft copolymer of the present invention will be describe below.

The graft copolymer of the present invention can be obtained by homopolymerizing formaldehyde with an anionic polymerization catalyst in the presence of monosaccharide and/or polysaccharide, each having a functional group selected from the group consisting of the hydroxyl group, carboxyl group, amino group, and amido group.

The monosaccharide and polysaccharide function as a chain transfer agent in the polymerization and reaction-bonds itself to polyacetal through the functional group of monosaccharide and/or polysaccharide, to give a copolymer having a structure comprising polyacetal units grafted to monosaccharide and/or polysaccharide units.

Typical examples of monosaccharide and polysaccharide are as follows:

In the first group,, examples made of monosaccharides include glucose, allose, altrose, mannose, gulose, idose, galactose, talose, fructose, ribose, arabinose, xylose, lyxose, erythrulose, threose, glucosamine, galactosamine, and the like.

In the second group, examples made of polysaccharides include maltose, isomaltose, cellobiose, lactose, sucrose, amylose, amylopectin, cellulose, pectic acid, chitin, chitosan, hyaluronic acid, dextran, pulluran, curdlan, sclerotane, β-1,3-glucan, levan α-1,6-mannan, cyclodextrin, xanthan gum, succinoglycan, and the like.

In the third group, examples made of compounds produced by chemically modifying a part or the whole of the functional groups of the monosaccharide or polysaccharide mentioned above include esterification, etherification, methylolation, tosylation, etc. Preferable methods of chemical modification are esterification, etherification and methylolation because of the ease of the production process.

Examples of esterification may be formed of acetylation, nitration, propionylation, butyrylation, methylcarbamylation, phenylthiocarbamylation, methoxycarbonylation, methacryloylation, etc.

Examples of etherification may be formed of methylation, ethylation, benzylation, carboxymethylation, carboxyethylation, hydroxyethylation, hydroxpropylation, etc.

It is preferable to select among the chemically modified compounds, those formed by methylolation, esterification or etherification of a part of the hydroxyl groups of cellulose because of their wide availability. Typical examples of such compounds include methylol cellulose, acetyl cellulose, nitrocellulose, propionyl cellulose, butyl cellulose, methyl cellulose, ethyl cellulose, hydroxymethyl cellulose, hydroxyethyl cellulose, hydroxypropyl cellulose, carboxymethyl cellulose carboxymethyl cellulose, carboxymethyl hydroxyethyl cellulose, benzyl cellulose, and the like.

The monosaccharides or polysaccharides are preferably purified by such means as washing, adsorption, drying, etc., prior to subjecting them to polymerization. The monosaccharide or polysaccharide each alone or a mixture may be used for polymerization.

In the homopolymerization according to the present invention, sufficiently purified formaldehyde is used as the starting material.

The anionic polymerization catalyst used in the homopolymerization according to the present invention includes the following compounds:

Alkali metals such as sodium, potassium, and the like; alkali metal complexes such as sodium-naphthalene, potassium-anthracene, and the like; alkali metal hydrides such as sodium hydride and the like; alkaline earth metal hydrides such as calcium hydride, and the like; alkali metal alkoxides such as sodium methoxide, potassium t-butoxide, and the like; alkali metal carboxylates such as sodium caproate, potassium stearate, and the like; alkaline earth metal carboxylates such as magnesium caproate, calcium stearate, and the like; amines such as n-butylamine, diethylamine, trioctylamine, pyridine, and the like; ammonium stearate; quaternary ammonium salts such as tetrabutylammonium methoxide, dimethyldistearylammonium acetate, and the like; phosphonium salts such as tetramethylphosphonium propionate, trimethylbenzylphosphonium ethoxide, and the like; tetravalent organotin compounds such as tributyltin chloride, diethyltin dilaurate, dibutyltin dimethoxide, and the like; and alkyl metals such as n-butyllithium, ethylmagnesium chloride, and the like. The preferable anionic polymerization catalysts, however, are quaternary ammonium salts.

The amount of anionic polymerization catalysts used range from 0.0001-5 parts by weight relative to 100 parts by weight of formaldehyde. Thus the amount of the anionic polymerization catalyst is too small, the thermoplastic graft copolymer of the present invention cannot be obtained. When the amount is too large, the thermal stability of the graft copolymer deteriorates greatly. The preferable amount of the catalyst is 0.0005-3 parts by weight. The polymerization is conducted in the absence of solvent or in an organic solvent.

Examples of the organic solvent usable in the present envision include aliphatic hydrocarbons such as n-pentane, n-hexane, n-heptane, n-octane, cyclohexane, cyclopentane, and the like; aromatic hydrocarbons such as benzene, toluene, xylene, and the like; halogenated aliphatic hydrocarbons such as methylene chloride, chloroform, carbon tetrachloride, ethylene chloride, trichloroethylene, and the like; and halogenated aromatic hydrocarbons such as chlorobenzene, o-dichlorobenzene, and the like. These organic solvents may be used individually or as a mixture of two or more thereof.

The monosaccharide or polysaccharide that functions as a chain transfer agent is used after uniformly dissolved or dispersed in the reaction system. The concentration of the chain transfer agent in the system can be easily determined by experiments according to the intended molecular weight of the desired graft copolymer.

The reaction temperature is usually selected from the range of $-20°$ to $230°$. The preferable range is $20°-210°$ C. when no solvent is used and $-10°-120°$ C. when organic solvents are used.

The reaction time is not particularly limited, but is usually selected from the range of 5 sec to 300 min.

As previously discussed, since the graft copolymer has unstable terminals, the terminals are stabilized by capping by such means as esterification, etherification, urethanization, and the like. The stabilized graft copolymer can then be used.

EXAMPLES

The present invention will be described in more detail below with reference to Examples. It is to be noted that the present invention is not to be limited to the Examples provided herebelow.

The items of determination in Examples given below are as follows:

Melting point: This is determined by using a differential scanning colorimeter (DSC). The $5\pm0.05$ mg of sample graft copolymer is loaded into the DSC at room temperature, then heated up to $200°$ C. at a rate of $320°$ C./min., and then cooled down to $130°$ C. at a rate of $10°$ C./min. Thereafter the melting point is determined at a temperature-increasing rate of $2.5°$ C./min. The melting point is the temperature corresponding to the maximum of heat absorption peak.

Viscosity: 25 mg of graft copolymer is dissolved in 5 ml of a solvent mixture consisting of 50% by weight of p-chlorophenol and 50% by weight of tetrachloroethane. The viscosity is then determined by using an Ostwald's viscometer at $60°$ C. Viscosity is an index of molecular weight.

Vibration fatigue characteristic: A test piece is cut out from a plate of graft copolymer and determination is made according to ASTM-D 671 at $20°$ C. and at a repeated vibration cycle of 1800 cycles/min. The maximum stress up to which the test piece does not fail when subjected to $10^6$ times of repeated vibration (that is, fatigue strength) is taken as the index of fatigue resistance—the higher the fatigue strength, the greater the fatigue resistance.

Abrasion loss: This is a measure of mechanical property. The abrasion loss of resin is determined according to JIS K 7218 A under the following conditions: opposite material S45C, face pressure 1 $kg/cm^2$, linear velocity 24 cm/sec, and travel distance 50 km—the smaller the abrasion loss, the greater the mechanical property.

Biodegradability: At a constant temperature of $30°$ C., 50 mg of a lytic enzyme is added to 10 ml of pure water, 10 mg of test film (0.1 mm thick) of graft copolymer is immersed therein, and the number of days in which the weight of the film reduces to half is determined—the faster the weight of the film reduces to half, the greater the biodegradability. Cellulase, chitinase or amylase is used as the lytic enzyme.

EXAMPLE 1

(1) Preparation of the graft copolymer 1,000 g of polysaccharide, acetyl cellulose (degree of acetylation: 50%), was suspended in 10 liter of cyclohexane. Each of 2,000 g/hr of anhydrous formaldehyde gas and 1.2 g/hr of tetrabutylammonium acetate (polymerization catalyst) was continuously added to the mixture for 2 hours while maintaining the temperature of polymerization at 50° C.

The polymer formed was then separated from cyclohexane, washed thoroughly with acetone and dried under vacuum at 60° C. to obtain 4,800 g of polymer.

(2) Confirmation of the structure of graft copolymer

The graft copolymer obtained in () above was extracted in toluene at 110° C. for 6 hours. No unreacted acetyl cellulose was detected.

A 5 g portion of the polymer was dispersed in 95 g of 0.3N aqueous hydrochloric acid solution and heated to 98° C. for 3 hours. While this heating operation decomposed all the polyacetal units into formaldehyde, acetyl cellulose underwent no decomposition. The acidic aqueous solution was neutralized with 0.5N aqueous sodium hydroxide solution, and the acetyl cellulose in the aqueous solution was separated, whereby 0.9 g of acetyl cellulose was recovered.

It is evident from the above result that polyacetal has been bonded to acetyl cellulose. The content of acetyl cellulose units in the graft copolymer was 18% by weight.

The graft copolymer had a melting point of 171° C. and viscosity of 1.1 (dl/g).

(3) Determination of properties of graft copolymer

A graft copolymer whose terminals had been stabilized by the use of acetic anhydride was incorporated with stabilizers (heat stabilizer: nylon 66, antioxidant: 2,2-methylenebis, 4-methyl 6-t-butylphenol) and melt-kneaded in a twin-screw extruder having a diameter D of 30 mm to obtain the graft copolymer in the form of pellets. The pellets were used in injection molding and showed a good moldability. The molded products there-obtained were tough and had excellent mechanical properties.

The properties and biodegradability of the molded product are as follows:

| | |
|---|---|
| Fatigue strength | 250 kg/cm$^2$ |
| Abrasion loss: | 3.1 × 10$^{-4}$ g/km |
| Biodegradability: | 11 days (Lytic enzyme: cellulase). |

As shown by these results, the graft copolymer of the present invention exhibits excellent mechanical characteristic properties of engineering resin and excellent biodegradability.

EXAMPLE 2

(1) Preparation of graft copolymer

Anhydrous formaldehyde has was introduced continuously at a rate of 2 kg/hr for 5 hours into 5 liter of cyclohexane containing 100 g/liter of polysaccharide consisting of ethyl cellulose (degree of ethylation: 30%) and 0.4 g/liter of polymerization catalyst consisting of dimethyldistearylammonium acetate.

Ethyl cellulose at a rate of 500 g/hr and cyclohexane containing 0.4 g/liter of dimethyldistearylammonium acetate at a rate of 5 liter/hr were fed continuously for 5 hours, concurrently with the supply of formaldehyde gas, while maintaining the polymerization temperature at 60° C. Cyclohexane containing the polymer was withdrawn continuously so as to balance with the amount of the raw materials supplied, and the polymer was separated from cyclohexane by filtration. The polymer was washed thoroughly with acetone and dried under vacuum at 60° C. to obtain 11.5 kg of polymer.

(2) Confirmation of the structure of graft copolymer

The polymer obtained in (1) above was extracted in toluene for 6 hours. No ethyl cellulose was detected.

A 5 g portion of the polymer was dispersed in 9.5 g of 0.3N aqueous hydrochloric acid solution and heated at 98° C. for 3 hours. While this heating operation decomposed all the polyacetal units formaldehyde, ethyl cellulose underwent no decomposition. The acidic aqueous solution was neutralized with 0.5N aqueous sodium hydroxide solution, and the ethyl cellulose in the aqueous solution was separated, whereby 1.05 g of ethyl cellulose was recovered.

It is evident from the above result that polyacetal has been bonded to ethyl cellulose. The content of ethyl cellulose units in the graft copolymer was 21% by weight.

The graft copolymer had a melting point of 169° C. and viscosity of 0.8 (g/dl).

(3) Determination of properties of graft copolymer

A graft copolymer whose terminals had been stabilized by the use of acetic anhydride was incorporated with the same stabilizers as used in Example 1, and injection-molded in the same manner as in Example 1. The moldability was good, and the molding having the following properties and biodegradability were obtained:

| | |
|---|---|
| Fatigue strength: | 230 kg/cm$^2$ |
| Abrasion loss: | 1.1 × 10$^{-4}$ g/km |
| Biodegradability: | 13 days (Lytic enzyme: cellulase). |

As shown by these results, the graft copolymer also exhibits excellent mechanical properties, fatigue strength as well as biodegradability.

EXAMPLE 3

(1) Preparation of graft copolymer

The same procedures as in Example 2 were followed except that polysaccharide consisted of hydroxyethyl cellulose (degree of hydroxyethylation: 20%) to obtain 11 kg of polymer.

(2) Confirmation of the structure of graft copolymer

The polymer obtained in (1) was extracted in dioxane for 6 hours. No hydroxyethyl cellulose was detected.

The polymer was hydrolyzed in the same manner as in Example 2 and the content of hydroxyethyl cellulose units in the graft copolymer was measured 19% by weight. The graft copolymer had a melting point of 169° C. and viscosity of 0.8 (dl/g).

(3) Determination of properties of graft copolymer

The graft copolymer obtained in (1) showed the following properties and biodegradability:

| | |
|---|---|
| Fatigue strength: | 240 kg/cm$^2$ |
| Abrasion loss: | 2.1 × 10$^{-4}$ g/km |
| Biodegradability: | 12 days (Lytic enzyme: cellulase). |

As evidenced by these results, the graft copolymer exhibits excellent engineering resin properties as well as good biodegradability.

COMPARATIVE EXAMPLE 1 (polyacetal resin)

The same procedures as in Example 2 were followed except that methanol (2.5 g/hr), a known chain transfer agent was used in place of ethyl cellulose. The polymer obtained showed the following properties and biodegradability:

| | |
|---|---|
| Fatigue strength: | 260 kg/cm$^2$ |
| Abrasion loss: | 1.3 × 10$^{-4}$ g/km |
| Biodegradability: | No decrease in weight even after a lapse of 200 days (Lytic enzyme: cellulase) |
| Viscosity: | 1.8 (dl/g) |
| Melting point: | 176° C. |

In the case of polyacetal resin, the resin exhibits excellent engineering resin properties, but no biodegradability.

COMPARATIVE EXAMPLE 2 (Japanese Patent Application Kokoku No. 46-22054)

A graft copolymer of cellulose ester was obtained in exactly the same manner as described in Example 1 of Japanese Patent Application Kokoku (Post-Exam. Publn.) No. 46-22054. The polymer obtained showed the following properties and biodegradability:

| | |
|---|---|
| Fatigue strength: | 110 kg/cm$^2$ |
| Abrasion loss: | 120 × 10$^{-4}$ g/km |
| Biodegradability: | No decrease in weight even after a lapse of 150 days (Lytic enzyme: cellulase). |

The graft copolymer described in Japanese Patent Application Kokoku (Post-Exam. Publn.) No 46-22054 exhibits no biodegradablility. Moreover, the graft copolymer would be a poor choice for engineering resin as it showed greatly deteriorated properties. The copolymer obtained by the process described in the Japanese Patent Application is essentially different in molecular structure from the graft copolymer of the present invention.

COMPARATIVE EXAMPLE 3 (J. Wood Chem. Technol., 3 (1), 59 (1983))

A solution containing 100 g of cellulose and 200 g of paraformaldehyde in 2.5 liter of dimethyl sulfoxide was prepared and then allowed to react while stirring and maintaining the temperature at 96°–105° C. for 11 minutes. The polymer thus formed was separated from dimethyl sulfoxide to obtain 210 g of polymer. The polymer had a melting point of 128° C.

The polymer was acetylated, then incorporated with stabilizers and injection molded. The moldings showed a good moldability and the following properties and biodegradability:

| | |
|---|---|
| Fatigue strength: | 40 kg/cm$^2$ |
| Abrasion loss: | 190 × 10$^{-4}$ g/km |
| Biodegradability: | 7 days (Lytic enzyme: cellulase). |

The cellulose rendered thermoplastic (i.e., methylolated cellulose) by this method exhibits excellent biodegradability, but has poor mechanical property and fatigue strength so that it is not useful as engineering resin.

EXAMPLES 4–25 and COMPARATIVE EXAMPLES 4–8

Thermoplastic graft copolymers shown in Table 1 were prepared by using the polymerization catalyst and catalyst concentration, monosaccharide and polysaccharide as shown therein. In all of the Examples, the polymers showed excellent mechanical property and fatigue strength, which are quite suitable for use as engineering resins, while at the same time exhibiting excellent biodegradability.

In Comparative Example 4, in contrast, the content of the polysaccharide units was too low, resulting in poor biodegradability. In Comparative Example 6, the graft copolymer exhibited a very poor mechanical property due to the viscosity being too low. In Comparative Example 7, the graft copolymer was difficult to process and mold due to the viscosity being to high.

In Comparative Example 8, the graft copolymer exhibited a low melting point and a very poor mechanical property due to the content of polysaccharide units being too high.

INDUSTRIAL APPLICABILITY

The thermoplastic graft copolymer of the present invention, intended for imparting thermoplasticity to monosaccharide and polysaccharide, makes it possible to form a thermoplastic resin which has both excellent mechanical properties required for engineering resin and biodegradability. The graft copolymer of the present invention can be put to wide range of uses including film, sheets, electric and electronic parts, automotive parts, and so forth. Moreover, molded articles from the graft copolymer, after being discarded, can easily be biodegraded. Thus, the copolymer is of great industrial utility value.

TABLE 1

| Example of Comp. Example | Polymerization catalyst | Catalyst concentration (part) | Monosaccharide or polysaccharide | Graft copolymer Melting point (°C.) | Viscosity number (dl/g) |
|---|---|---|---|---|---|
| Example 4 | Tetrabutyl-ammonium methoxide | 0.05 | Acetyl cellulose (Acetylation degree 35%) | 170 | 8.3 |

TABLE 1-continued

| | | | | | |
|---|---|---|---|---|---|
| Example 5 | Tetrabutyl-ammonium acetate | 0.01 | Glusosamine | 174 | 0.14 |
| Example 6 | Dimethyldistearylammonium stearate | 0.1 | Glucose | 173 | 1.4 |
| Example 7 | Tetraethyl-ammonium | 2 | Amylose | 171 | 1.1 |
| Example 8 | Dimethyldistearylammonium stearate | 0.001 | Methylcellulose (Methylation degree 30%) | 168 | 0.8 |
| Example 9 | Dimethyldistearylammonium stearate | 0.01 | Hydroxethyl cellulose (Hydroxyethylation degree 50%) | 165 | 0.7 |
| Example 10 | Dimethyldistearylammonium stearate | 0.01 | Hydroxypropyl cellulose (Hydroxypropylation degree 50%) | 164 | 0.6 |
| Example 11 | Dimethyldistearylammonium stearate | 0.01 | Nitrocellulose (Nitration degree 40%) | 170 | 1.4 |
| Example 12 | Dimethyldistearylammonium stearate | 1.0 | Proponyl cellulose (Propionylation degree 60%) | 152 | 1.6 |
| Example 13 | Dimethyldistearylammonium stearate | 2.0 | Butyl cellulose (Butylation degree 50%) | 160 | 0.6 |
| Example 14 | Dimethyldistearylammonium stearate | 0.005 | Butyryl cellulose (Butyrylation degree 40%) | 169 | 0.7 |
| Example 15 | Tetrabutyl-ammonium acetate | 0.1 | Benzyl cellulose (Benzylation degree 30%) | 174 | 3.0 |
| Example 16 | Tetramethyl-ammonium stearate | 2.5 | Carboxymethyl cellulose (Carboxymethylation degree 20%) | 158 | 0.3 |
| Example 17 | Tetramethyl-ammonium stearate | 0.05 | Carboxyethyl cellulose carboxyethylation degree 10%) | 172 | 1.6 |
| Example 18 | Tetramethyl-ammonium stearate | 0.05 | Chitin | 170 | 2.1 |
| Example 19 | Tetraethyl-ammonium stearate | 0.01 | Acetyl chitin (Acetylation degree 30%) | 165 | 0.7 |
| Example 20 | Tetraethyl-ammonium stearate | 0.01 | Isomaltose | 161 | 0.5 |
| Example 21 | Tetraethyl-ammonium stearate | 0.01 | Dextran | 163 | 0.5 |
| Example 22 | Dimethyldistearylammonium acetate | 0.005 | Cellulose | 175 | 3.2 |
| Example 23 | Dimethyldistearylammonium acetate | 0.005 | Cellulose | 174 | 3.0 |
| Example 24 | Dimethyldistearylammonium acetate | 0.005 | Cellulose | 170 | 1.8 |
| Example 25 | Dimethyldistearylammonium acetate | 0.05 | Cellulose | 169 | 1.3 |
| Comp. Example 4 | Tetrabutyl-ammonium acetate | 0.01 | Butyl cellulose (Butylation degree 50%) | 175 | 1.3 |
| Comp. Example 5 | Tetrabutyl-ammonium | 0.01 | Acetyl cellulose | 160 | 2.5 |

TABLE 1-continued

| | | acetate | (Acetylation degree 30%) | | |
|---|---|---|---|---|---|
| Comp. Example 6 | Tetraethyl-ammonium acetate | 0.01 | Ethyl cellulose (Ethylation degree 32%) | 161 | 0.08 |
| Comp. Example 7 | Tetraethyl-ammonium acetate | 0.01 | Cellulose | 165 | 11 |
| Comp. Example 8 | Tetraethyl-ammonium acetate | 0.05 | Carboxyethyl cellulose (Carboxyethylation degree 10%) | 145 | 8.0 |

| Graft copolymer | Graft copolymer property | | | |
|---|---|---|---|---|
| Monosaccharide unit of poly-saccharide unit content (% by wt) | Fatigue strength (kg/cm$^2$) | Abrasion loss ($\times 10^{-4}$ g/km) | Biodegradability | |
| | | | Enzyme | Half value period (days) |
| 15 | 250 | 0.8 | Cellulase | 14 |
| 5 | 180 | 12 | Cellulase | 28 |
| 1.1 | 260 | 1.1 | Amylase | 33 |
| 2.0 | 260 | 2.1 | Amylase | 29 |
| 25 | 260 | 5.2 | Cellulase | 10 |
| 36 | 220 | 6.8 | Cellulase | 8 |
| 40 | 210 | 8.3 | Cellulase | 7 |
| 15 | 250 | 3.1 | Cellulase | 13 |
| 42 | 200 | 7.2 | Cellulase | 10 |
| 49 | 200 | 8.6 | Cellulase | 8 |
| 18 | 245 | 4.2 | Cellulase | 16 |
| 1.4 | 270 | 1.2 | Cellulase | 33 |
| 53 | 180 | 12 | Cellulase | 7 |
| 11 | 250 | 2.2 | Cellulase | 19 |
| 13 | 240 | 1.8 | Chitinase | 18 |
| 22 | 240 | 4.6 | Chitinase | 13 |
| 56 | 180 | 9.7 | Amylase | 8 |
| 41 | 200 | 7.8 | Amylase | 12 |
| 2 | 260 | 1.4 | Cellulase | 28 |
| 5 | 255 | 1.7 | Cellulase | 21 |
| 36 | 205 | 5.3 | Cellulase | 9 |
| 45 | 200 | 16 | Cellulase | 8 |
| 0.8 | 250 | 1.3 | Cellulase | 140 |
| 65 | 80 | 70 | Cellulase | 9 |
| 55 | 43 | 175 | Cellulase | 9 |
| 33 | Unmeasurable due to difficult molding and processing | | Cellulase | 20 |
| 88 | 35 | 121 | Cellulase | 7 |

Note:
*1) Ratio relative to 100 parts by weight of formaldehyde.

We claim:

1. A thermoplastic graft copolymer consisting essentially of monosaccharide or polysaccharide units, each having a functional group selected from the group consisting of the hydroxyl group, carboxyl group, amino group and amido group, and polyacetal units consisting of repetitive oxymethylene units (—CH$_2$O—) which are reaction bonded with each other through said functional group, said monosaccharide or polysaccharide units constituting backbone of the copolymer and said polyacetal units constituting graft of the copolymer, said graft being graft-polymerized to said backbone, and said copolymer having viscosity of 0.1–10 (dl/g) as determined in a mixed solvent system consisting of 50% by weight of p-chlorophenol and 50% by weight of tetrachloroethane by using a conventional Ostwald's viscometer at 60° C. and a melting point of 150°–175° C.

2. A thermoplastic graft copolymer according to claim 1, wherein the polysaccharide units consist of cellulose, methylol cellulose, cellulose ester, cellulose ether, or amylose.

3. A thermoplastic graft copolymer according to claim 2, wherein the cellulose ester is acetyl cellulose, nitrocellulose, propionyl cellulose, or butyryl cellulose.

4. A thermoplastic graft copolymer according to claim 2, wherein the cellulose ether is methyl cellulose, ethyl cellulose, hydroxyethyl cellulose, hydroxypropyl cellulose, carboxymethyl cellulose, carboxyethylcellulose or benzyl cellulose.

5. A thermoplastic graft copolymer according to claim 1, wherein the content of the polysaccharide unit is 1–60% by weight based on the total weight of the graft copolymer.

6. A thermoplastic graft copolymer according to claim 1, wherein said viscosity is 0.5–5 (dl/g).

7. A process for producing a thermoplastic graft copolymer consisting essentially of monosaccharide or polysaccharide units, each having a functional group selected from the group consisting of the hydroxyl group, carboxyl group, amino group and amido group, and polyacetal units consisting of repetitive oxymethylene units (—CH$_2$O—) which are reaction bonded with each other through said functional group, said monosaccharide or polysaccharide units constituting backbone of the copolymer and said polyacetal units constituting graft of the copolymer, said graft being graft-polymerized to said backbone, and said copolymer having viscosity of 0.1–10 (dl/g) as determined in a mixed solvent system consisting of 50% by weight of p-chlorophenol and 50% by weight of tetrachloroethane by using a conventional Ostwald's viscometer at 60° C. and a melting point of 150°–175° C. by homopolymerizing formaldehyde in the presence of said monosaccharide or polysaccharide units or combination of both, with an anionic polymerization catalyst to impart biogradability.

8. A process for producing a thermoplastic graft copolymer according to claim 7, wherein the polysaccharide units consist of cellulose, methylol cellulose, cellulose ester, cellulose ether or amylose.

9. A process for producing a thermoplastic graft copolymer according to claim 8, wherein the cellulose ester is acetyl cellulose, nitrocellulose, propionyl cellulose or butyryl cellulose.

10. A process for producing a thermoplastic graft copolymer according to claim 8, wherein the cellulose ether is methyl cellulose, ethyl cellulose, hydroxyethyl cellulose, hydroxypropyl cellulose, carboxymethyl cellulose, carboxymethyl cellulose, or benzyl cellulose.

11. A process for producing a thermoplastic graft copolymer according to claim 7, wherein the anionic polymerization catalyst is a quaternary ammonium salt.

12. A process for producing a thermoplastic graft copolymer according to claim 7, wherein the amount of anionic polymerization catalyst used is 0.0005–3 parts by weight relative to 100 parts by weight of formaldehyde.

* * * * *